(12) United States Patent
Tanaka et al.

(10) Patent No.: US 10,913,121 B2
(45) Date of Patent: Feb. 9, 2021

(54) OPERATIONAL CONTROL METHOD IN MACHINE TOOL

(71) Applicant: Okuma Corporation, Niwa-Gun (JP)

(72) Inventors: Takaaki Tanaka, Niwa-Gun (JP);
Ryosuke Sasaki, Niwa-Gun (JP)

(73) Assignee: Okuma Corporation, Niwa-Gun (JP)

( * ) Notice: Subject to any disclaimer, the term of this patent is extended or adjusted under 35 U.S.C. 154(b) by 0 days.

(21) Appl. No.: 15/881,947

(22) Filed: Jan. 29, 2018

(65) Prior Publication Data

US 2018/0243833 A1 Aug. 30, 2018

(30) Foreign Application Priority Data

Feb. 24, 2017 (JP) .................................. 2017-033858

(51) Int. Cl.
*B32B 7/12* (2006.01)
*B32B 1/00* (2006.01)
*B23B 7/12* (2006.01)
*B23Q 39/02* (2006.01)
*G05B 19/4065* (2006.01)
*B23B 1/00* (2006.01)
(Continued)

(52) U.S. Cl.
CPC .................. *B23B 7/12* (2013.01); *B23B 1/00* (2013.01); *B23Q 39/026* (2013.01);
(Continued)

(58) Field of Classification Search
CPC .......... B23Q 1/01; B23Q 1/017; B23Q 1/012; B23Q 1/015; B23Q 1/70; B23Q 5/34; B23Q 5/40; B23Q 5/44; B23Q 5/42; B23Q 11/0078; B23Q 11/0085; B23Q 11/04; B23Q 39/02; B23Q 39/021; B23Q 39/023; B23Q 39/028; B23Q 39/024; B23Q 39/026; B23Q 2039/006; B23Q 2039/002;
(Continued)

(56) References Cited

U.S. PATENT DOCUMENTS 4,185,376 A * 1/1980 Johnstone ............. B23B 49/001
408/56
4,456,960 A * 6/1984 Wakai ................ G05B 19/4062
318/565
(Continued)

FOREIGN PATENT DOCUMENTS

JP H07-025006 B2 3/1995
JP H09-150348 A1 6/1997

*Primary Examiner* — Nicole N Ramos
(74) *Attorney, Agent, or Firm* — Burr & Brown, PLLC

(57) ABSTRACT

An operational control method is provided for a machine tool that includes a plurality of tool holders with a cutting-tool. The machine tool relatively moves the tool holders with respect to a workpiece to process the workpiece. The operational control method includes determining whether an abnormality has occurred in the cutting-tool during a processing or not, determining whether a simultaneous processing in which at least two or more of the tool holders perform the processings to an identical workpiece is being performed or not and whether the cutting-tool having the detected abnormality is the cutting-tool that is performing the simultaneous processing or not when the abnormality is detected, and causing the tool holder with the cutting-tool having the detected abnormality to take an abnormality avoidance operation and another of the tool holders to take a response operation based on a determination result at the determining of the simultaneous processing.

15 Claims, 5 Drawing Sheets

(51) Int. Cl.
  *B23B 3/16* (2006.01)
  *B23Q 39/00* (2006.01)
(52) U.S. Cl.
  CPC .......... *G05B 19/4065* (2013.01); *B23B 3/167* (2013.01); *B23B 2270/36* (2013.01); *B23B 2270/48* (2013.01); *B23Q 2039/008* (2013.01); *G05B 2219/37245* (2013.01); *G05B 2219/37252* (2013.01); *G05B 2219/50203* (2013.01)
(58) Field of Classification Search
  CPC ... B23B 1/00; B23B 2270/36; B23B 2270/48; B23B 3/167; B23B 7/12; B23B 39/16; B23B 39/161; B23B 29/24; B23C 1/08; B23C 1/04; G05B 19/4065; G05B 2219/37244; Y10T 483/136; Y10T 483/138
  See application file for complete search history.

(56) References Cited

U.S. PATENT DOCUMENTS

| | | | |
|---|---|---|---|
| 4,802,274 A * | 2/1989 | Petrof | B23Q 11/04 340/680 |
| 5,060,544 A | 10/1991 | Hanaki et al. | |
| 5,342,275 A * | 8/1994 | Yanase | B23B 49/001 483/1 |
| 5,920,973 A * | 7/1999 | Kosmowski | B23B 39/16 29/26 A |
| 6,161,055 A * | 12/2000 | Pryor | G05B 19/4065 382/152 |
| 6,298,531 B1 * | 10/2001 | Baumbusch | B23Q 1/015 29/36 |
| 7,258,514 B2 * | 8/2007 | Bauer | B23Q 11/0003 408/46 |
| 8,061,940 B2 * | 11/2011 | Prust | B23Q 1/70 409/231 |
| 8,672,820 B2 * | 3/2014 | Uchikawa | B23Q 3/15733 29/33 P |
| 2009/0198367 A1 * | 8/2009 | Matsumoto | G05B 19/4155 700/112 |
| 2013/0272813 A1 * | 10/2013 | Bichsel | B23C 1/12 409/132 |
| 2013/0331244 A1 * | 12/2013 | Onsrud | B23Q 3/15786 483/1 |
| 2014/0103853 A1 * | 4/2014 | Yoshida | H02P 29/02 318/563 |
| 2018/0104780 A1 * | 4/2018 | Shinoda | B23Q 5/02 |

* cited by examiner

OPERATIONAL CONTROL METHOD IN MACHINE TOOL

BACKGROUND

This application claims the benefit of Japanese Patent Application Number 2017-033858 filed on Feb. 24, 2017, the entirety of which is incorporated by reference.

Technical Field

The disclosure relates to an operational control method for, for example, when an abnormality occurs in a cutting-tool during a simultaneous processing where a plurality of tool holders are operated in a machine tool, such as an NC lathe.

Related Art

Conventionally, there has been, what is called, a simultaneous processing, a machining method that performs the processing on one workpiece by operating a plurality of tool holders. The simultaneous processing includes, for example, a method that uses an NC lathe that includes a plurality of tool posts holding cutting tools, simultaneously applies the plurality of cutting tools to one workpiece, and simultaneously performs different processings using the respective cutting tools (illustrated in FIG. 3). With such a simultaneous processing, a processing period for the one workpiece can be shortened. Moreover, in a turning process with respect to a long workpiece as described, for example, in Japanese Unexamined Patent Application Publication No. 9-150348, two cutting-tools perform a processing so as to sandwich a workpiece to ensure reducing a deformation of the workpiece and achieving the accurate processing.

On the other hand, there has been devised a method that avoids a damage in the workpiece and the machine tool by retreating the cutting-tool from the workpiece when an abnormality is detected during the processing. For example, with a method described in Japanese Examined Patent Application Publication No. 7-25006, a cutting load direction applied to a workpiece is obtained and a cutting-tool is retreated in a direction opposite to the cutting load direction when an abnormality is detected.

Here, in the case where a cutting-tool is retreated from a workpiece based on a detection of an abnormality during a simultaneous processing in a machine tool that includes a plurality of tool posts as described above, a retreat operation has to be performed by taking a state of other tool posts into consideration. For example, a processing to finish a workpiece W having an outer diameter of φ 40 mm into φ 30 mm is taken as an example. Then, it is assumed that a cutting-tool 31 (here a tool bit for rough processing) installed on a tool post A in FIG. 3 removes the outer diameter to φ 30.4 mm and a cutting-tool 32 (here a tool bit for finishing) installed on a tool post B trims the outer diameter to φ 30 mm. In this case, since the tool post B follows after the tool post A, when an abnormality occurs in the cutting-tool 31 in the tool post A and then, the tool post A is retreated, a cutting amount of the cutting-tool 32 of the tool post B sharply increases from 0.2 mm to 5.0 mm. Accordingly, a load applied to the cutting-tool 32 sharply increases, which consequently leads to a breakage of the cutting-tool 32 and a breakage of the workpiece W.

It is assumed that while the two cutting-tools are performing the processing so as to sandwich the workpiece, an abnormality is detected in any one of the cutting-tools and then, the retreat operation is caused. Then, degraded processing accuracy is caused due to an absence of a deformation reduction effect on the workpiece provided by the two cutting-tools sandwiching the workpiece (for example, as illustrated in FIG. 4, a situation indicated by a two-dot chain line at first is changed to bend the workpiece W as indicated by a solid line due to the retreat of the tool post B).

Accordingly, when an abnormality has been detected during the simultaneous processing, the processing with all the cutting-tools have been stopped and all the cutting-tools have been retreated from the workpiece.

However, when considering a lathe that includes, for example, a sub spindle as a machine tool that performs a processing by operating a plurality of tool holders, a main spindle and the sub spindle possibly perform the processings to respective different workpieces. Accordingly, it is assumed that despite in such situation, an abnormality is detected, for example, in the processing of the main spindle, and the processing with all the cutting-tools are stopped and all the cutting-tools are retreated from the workpiece. Then, even the processing with the sub spindle insusceptible to the abnormality of the main spindle is halted, thus degrading processing efficiency by requiring a skill and a time for recovery. Moreover, it is probable that the workpiece cannot be reprocessed.

The disclosure is made in view of the above-described problems and it is an object of the disclosure to provide an operational control method in a machine tool that can take an appropriate response operation depending on a processing condition when an abnormality is detected during the processing.

SUMMARY

In order to achieve the above-described object, there is provided an operational control method in a machine tool according to a first aspect of the disclosure. The machine tool includes a plurality of tool holders with a cutting-tool and relatively moves the tool holders with respect to a workpiece to process the workpiece. The operational control method includes determining whether an abnormality has occurred in the cutting-tool during a processing or not. Further, the operational control method includes determining whether a simultaneous processing in which at least two or more of the tool holders perform the processings to an identical workpiece is being performed or not and whether the cutting-tool having the detected abnormality is the cutting-tool that is performing the simultaneous processing or not when the abnormality is detected. Further, the operational control method includes causing the tool holder with the cutting-tool having the detected abnormality to take an abnormality avoidance operation and another of the tool holders to take a response operation based on a determination result at the determining of the simultaneous processing.

In order to achieve the above-described object, the disclosure according to a second aspect among the disclosure is an operational control method in a machine tool. The machine tool includes a plurality of tool holders with a cutting-tool and relatively moves the tool holders with respect to a workpiece to process the workpiece. The operational control method includes determining whether an abnormality has occurred in the cutting-tool during a processing or not. Further, the operational control method includes determining whether a simultaneous processing in which at least two or more of the tool holders perform the processings to an identical workpiece is being performed or not and whether the cutting-tool having the detected abnormality is the cutting-tool that is performing the simultaneous processing or not when the abnormality is detected. Further, the operational control method includes determining a magnitude of an effect on the processing with another of the tool holders in the case where the tool holder with the cutting-tool having the detected abnormality is caused to take an abnormality avoidance operation. Furthermore, the operational control method includes causing the tool holder with the cutting-tool having the detected abnormality to take the abnormality avoidance operation and the other of the tool holders to take a response operation based on determination results at the determining of the simultaneous processing and the determining of the magnitude.

In order to achieve the above-described object, the disclosure according to a third aspect among the disclosure is an operational control method in a machine tool. The machine tool includes a plurality of tool holders with a cutting-tool and relatively moves the plurality of tool holders with respect to a workpiece to simultaneously process the workpiece. The operational control method includes determining whether an abnormality has occurred in the cutting-tool during a processing or not. Further, the operational control method includes determining a magnitude of an effect on the processing with another of the tool holders in the case where the tool holder with the cutting-tool having the detected abnormality is caused to take an abnormality avoidance operation when the abnormality is detected. Further, the operational control method includes causing the tool holder with the cutting-tool having the detected abnormality to take the abnormality avoidance operation and the other of the tool holders to take a response operation based on a determination result at the determining of the magnitude.

In the disclosure according to a fourth aspect according to the second aspect or the third aspect, upon determining the magnitude of the effect on the processing with the other of the tool holders in the case where the tool holder with the cutting-tool having the detected abnormality is caused to take the abnormality avoidance operation, the operational control method may execute at least any one of a method of determining the magnitude from a variation amount of a cutting amount to the workpiece based on a current position and a travelling direction of each of the tool holders and a method of determining the magnitude from whether each of the tool holders is positioned in a preliminary set affected area or not based on the current position of each of the tool holders.

With the embodiment, it is determined whether the simultaneous processing in which at least two or more of the tool holders perform the processings to the identical workpiece is being performed or not and whether the cutting-tool having the detected abnormality is the cutting-tool that is performing the simultaneous processing or not when the abnormality is detected in the cutting-tool that is performing the processing (the first and the second aspects). With the disclosure, it is determined the magnitude of the effect on the processing with the other of the tool holders in the case where the tool holder with the cutting-tool having the detected abnormality is caused to take the abnormality avoidance operation (the second and the third aspects). Then, the tool holder with the cutting-tool having the detected abnormality is caused to take the abnormality avoidance operation and the other of the tool holders is caused to take the response operation based on these determination results. Accordingly, even when the abnormality has occurred in the one tool holder, the processing can be continued, for example, when the simultaneous processing is not being performed and when the other of the tool holders receives small effect on the processing. Thus, a labor and a time required for recovery are reduced to ensure achieving an improvement in processing efficiency and reducing the workpieces with processing failures.

DETAILED DESCRIPTION

The following describes an operational control method in an NC lathe 10 as one embodiment of the disclosure in details based on the drawings.

Figure 1:
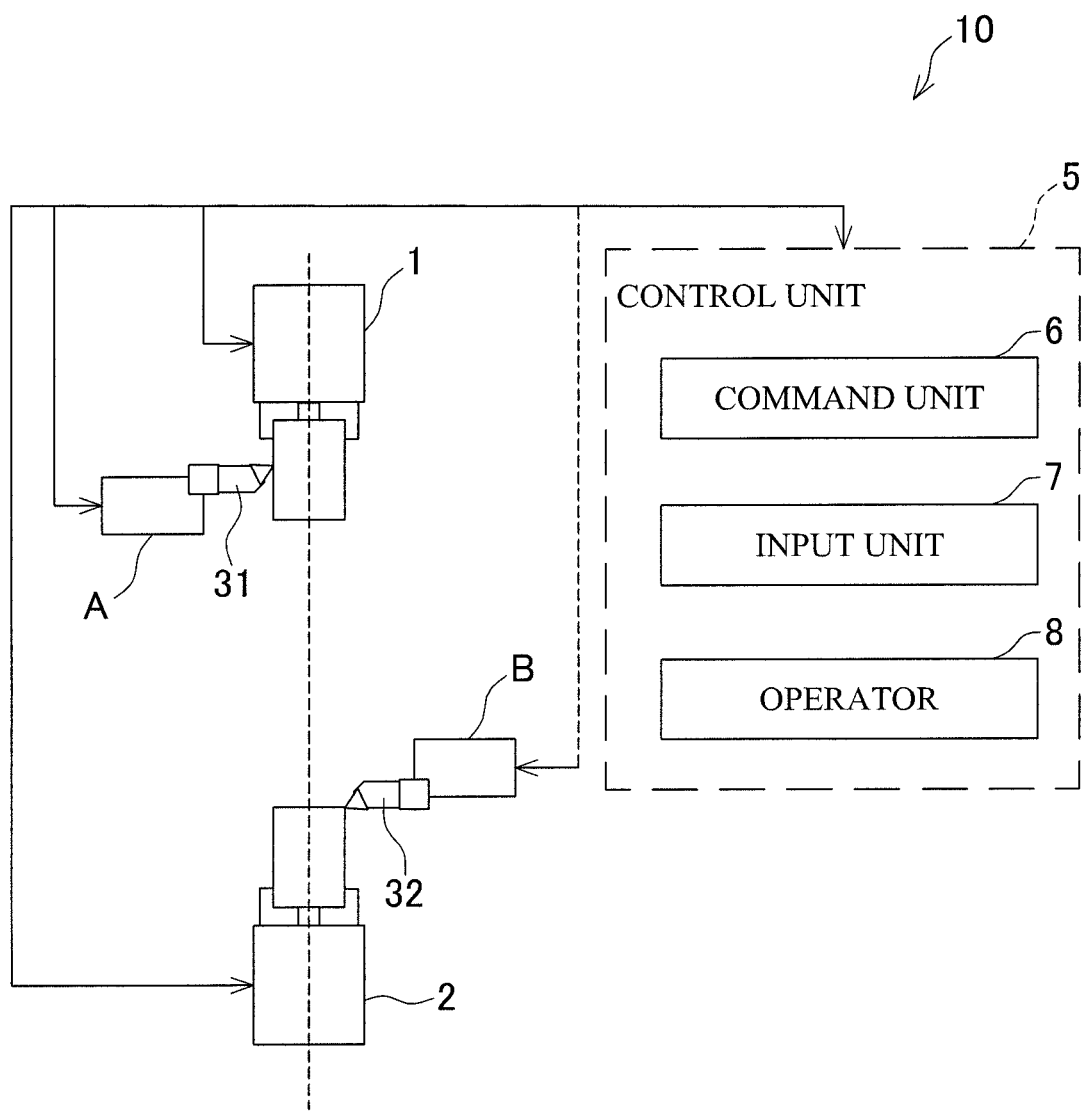
FIG. 1 is an explanatory view illustrating an NC lathe.

FIG. 1 is an explanatory view illustrating the NC lathe 10.

First, a mechanical structure of the NC lathe 10 will be described. The NC lathe 10 includes a main spindle 1 and a sub spindle 2, a tool post A and a tool post B, and a control unit 5. The main spindle 1 and the sub spindle 2 are configured to rotate a chucked workpiece. The tool post A and the tool post B are loaded with cutting-tools 31 and 32, respectively. The control unit 5 controls operations of the main spindle 1 and the sub spindle 2, and the tool post A and the tool post B. The control unit 5 includes an input unit 7, an operator 8, and a command unit 6. The input unit 7 is for an operator to input, for example, a driving command of a motor. The operator 8 is for, for example, interpreting a configured processing program. The command unit 6 is for, for example, a command to each of the motors based on the processing program. In the NC lathe 10, four of the main spindle 1, the sub spindle 2, the tool post A, and the tool post B (two tool holders) are configured to operate independently from one another under control of the control unit 5.

Figure 2:
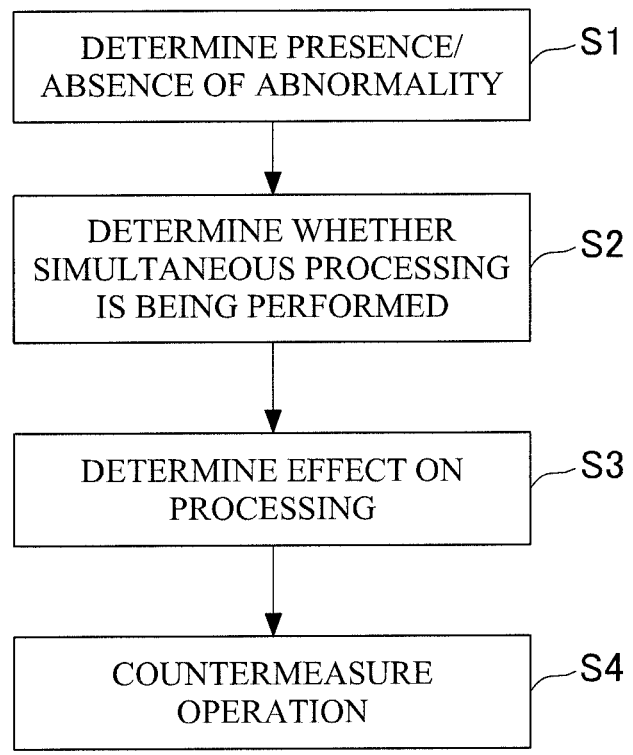
FIG. 2 is a flowchart illustrating an operational control when an abnormality is detected during a simultaneous processing.
Figure 3:
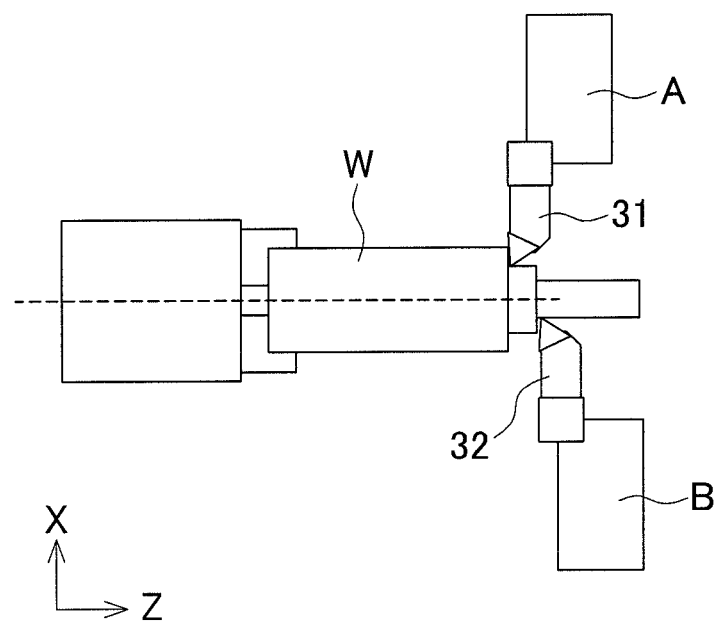
FIG. 3 is an explanatory view illustrating an exemplary simultaneous processing in the NC lathe.
Figure 4:
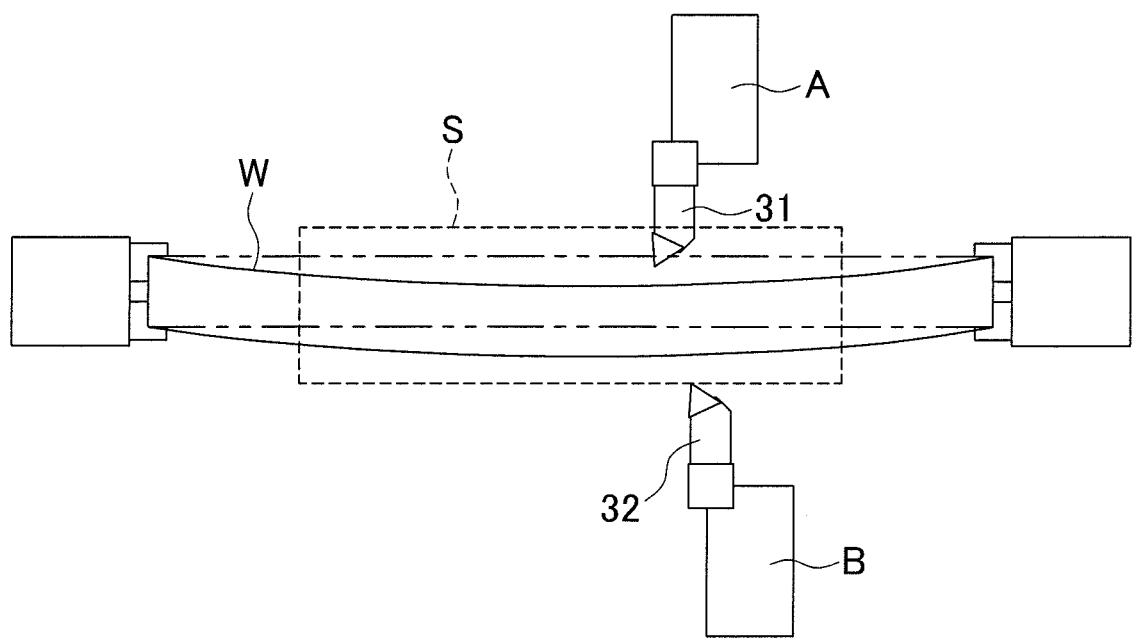
FIG. 4 is an explanatory view illustrating another exemplary simultaneous processing in the NC lathe.

Here, a description will be given of a main part of the disclosure, an operational control when an abnormality is detected during the simultaneous processing in which a plurality of tool holders are operated. FIG. 2 is a flowchart illustrating the operational control when the abnormality is detected during the simultaneous processing. FIG. 3 and FIG. 4 are explanatory views illustrating examples of the simultaneous processing in the NC lathe 10.

First, take a look at an overall control. In the NC lathe 10, it is determined whether an abnormality is occurring in the processing or not in association with a start of the processing (S1). When the abnormality is occurring in the processing, it is determined whether the simultaneous processing is being performed or not (S2). Furthermore, when the simultaneous processing is being performed, it is determined an effect on the processing in the case where a tool post in a side where the abnormality is occurring is retreated (S3). In accordance with the determination of the effect on the processing, operations of both the tool posts A and B are controlled (S4).

Next, concrete examples of the operations at respective steps will be described in details. As a determination method at S1, there is a method that detects a load in the motor that drives the tool posts A and B. Then, the method determines that a loss or a breakage in the cutting-tools 31 and 32 is occurring, that is, the abnormality in the processing is occurring, based on the detected value exceeding a predetermined threshold. Another method may install acceleration sensors on the tool posts A and B and detect the occurrence of the abnormality based on the output values. Further, it is considered a method that installs temperature sensors on the tool posts A and B and detects the occurrence of the abnormality based on the output values (detection of an abnormal temperature).

As a determination method at S2, it is considered a first method that makes a determination based on current positions of the respective tool posts A and B. For example, when the current position of the tool post A is closer to the sub spindle 2 than to the main spindle 1, it is determined that the cutting-tool 31 of the tool post A is processing a workpiece chucked on the sub spindle 2. Then, it is simply determined that, when the current position of the tool post B is closer to the sub spindle 2 than to the main spindle 1, the simultaneous processing is being performed. On the other hand, when the current position of the tool post B is close to the main spindle 1, it is simply determined that the simultaneous processing is not being performed. It is also considered a second method that makes a determination by a command coordinate system of the processing program configured for the NC lathe 10. That is, when different workpieces are processed on the main spindle 1 and the sub spindle 2, program commands are typically performed by different coordinate systems. Therefore, when origins of the coordinate system referred in the operation of the tool post A and the coordinate system referred in the operation of the tool post B are identical, it is simply determined that the simultaneous processing is being performed. When the origins are different, it is simply determined that the simultaneous processing is not being performed.

In addition, as a determination method at S2, it is considered a third method that makes a determination from operating states of the main spindle 1 and the sub spindle 2. For example, when a long workpiece is processed, the processing is sometimes performed with one end of the one workpiece being chucked onto the main spindle 1 and the other end being chucked onto the sub spindle 2. At this time, the sub spindle 2 is rotated in synchronization with the main spindle 1 or rotated in accordance with a rotation of the main spindle 1 without a driving power. Therefore, when the operating state of the sub spindle 2 synchronizes with or corotated with the main spindle 1, it is simply determined that the simultaneous processing is being performed, and if not, it is simply determined that the simultaneous processing is not being performed.

Furthermore, as a determination method at S3, it is considered a first method that makes a determination from a relative position between the tool posts A and B and a travelling direction of the tool posts A and B during the simultaneous processing. For example, as illustrated in FIG. 3, it is assumed that the simultaneous processing in a −Z direction is being performed such that the tool post B follows after the tool post A. At this time, assuming that an X coordinate of the tool post A is XA and a Z coordinate of the tool post A is ZA, and an X coordinate of the tool post B is XB and a Z coordinate of the tool post B is ZB, then XA≥XB and ZA≤ZB. When this relationship is satisfied, even when the tool post B is retreated, an effect on the processing is small. However, when the tool post A is retreated, a cutting amount of the tool post B in the Z direction sharply increases and an effect on the processing is large. Thus, the method determines that it is highly likely to develop into a failure.

As another determination method at S3, it is considered a second method that defines an affected area in which the processing accuracy deteriorates when the simultaneous processing is halted and makes a determination by whether each of the tool posts A and B is positioned within the affected area or not. For example, as illustrated in FIG. 4, it is assumed that an abnormality has occurred in the cutting-tool 32 of the tool post B when the simultaneous processing is being performed to the long workpiece. Then, the following equation estimates a deformation of the workpiece due to a machining force when the tool post B is retreated.

$$\delta = \frac{P}{6l^2 EI}[-(l-x)^2(l+2x)]x^3 + 3lx_3(l-x)^2 \quad \text{[Equation 1]}$$

δ: deflection [mm] x: processing position [mm] I: moment of inertia of area [mm$^4$] P: cutting force [N] l: length between fixations of workpiece [mm] E: modulus of longitudinal elasticity [N/mm$^2$]

Figure 5:
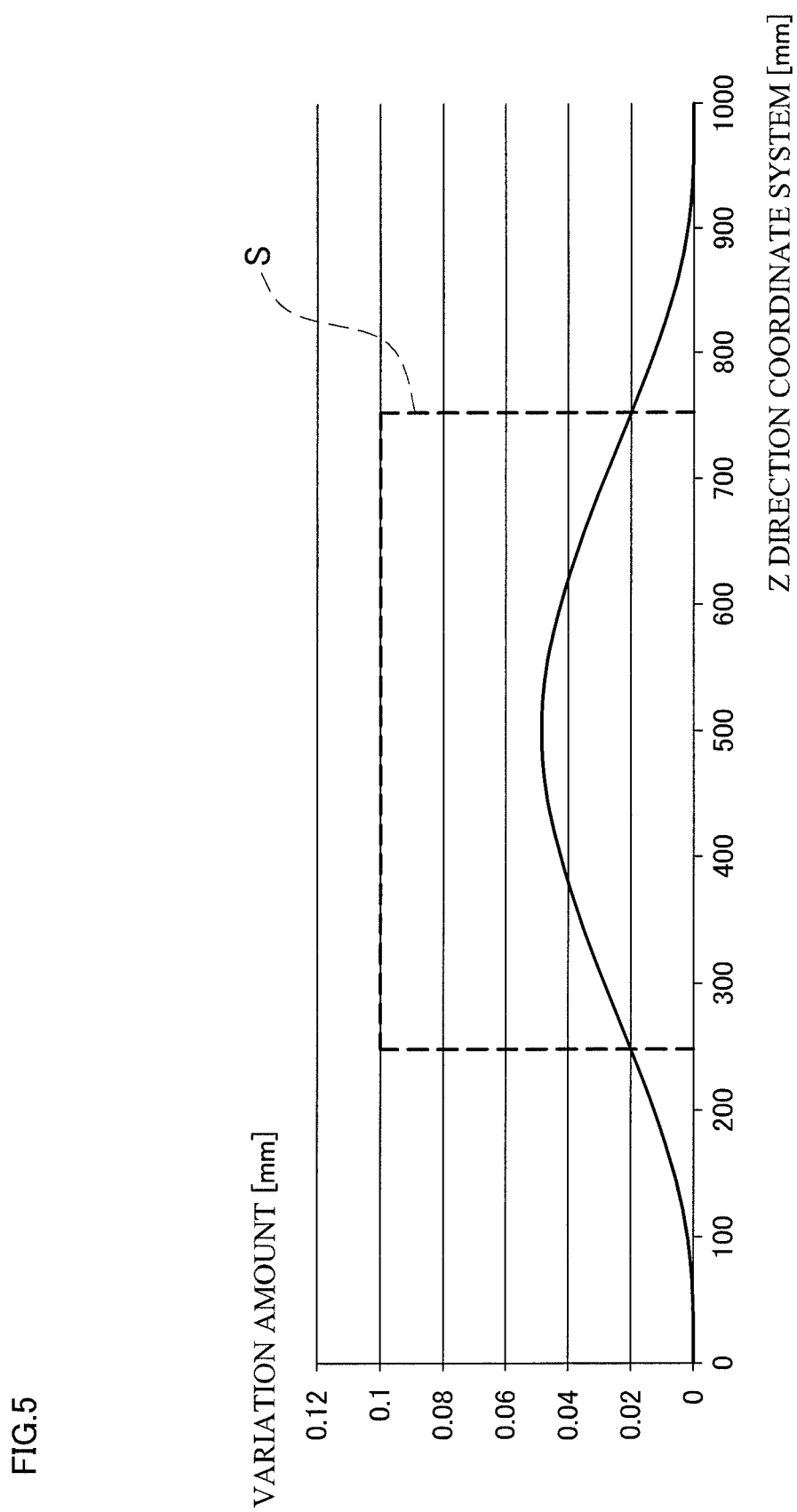
FIG. 5 is a graph estimating a deformation amount of a predetermined workpiece when the workpiece is processed with a predetermined cutting force.

Here, FIG. 5 illustrates a graph that estimates a deformation amount of the workpiece when the processing is performed with a cutting force of 15 N to a workpiece made of S45C having a diameter of φ 20 mm and a length of 1000 mm. Then, when, for example, a required tolerance is 0.02 mm, and when the current position of the tool post A is within a range of 0 to 250 mm or 750 to 1000 mm, the tool post A is out of an affected area S. Thus, the required accuracy is obtained. Therefore, it is determined that the effect on the processing is small even though the tool post B is retreated. On the other hand, when the current position of the tool post A is within a range of 250 to 750 mm, the tool post A is in the affected area S. Thus, when the tool post B is retreated, it is highly likely to fail to obtain the required accuracy. Therefore, it is determined that the effect on the processing is large. Here, while the deformation of the workpiece is estimated, the target may be a jig or a cutting-tool, or may be a combination of the jig and the cutting-tool.

Then at S4, even when the occurrence of the abnormality is detected in the one tool post, as long as the simultaneous processing is not being performed with the other tool post, only the one tool post is retreated and the other tool post continues to perform the processing. Even when the simultaneous processing is being performed, when it is determined that the effect on the processing is small, only the one tool post is retreated and the other tool post continues to perform the processing. However, when it is determined that the effect on the processing is large, the other tool post is retreated together with the one tool post.

With the operational control method in the NC lathe 10 as described above, even when the occurrence of the abnormality is detected in one tool post, as long as the simultaneous processing is not being performed with the other tool post, only the one tool post is retreated and the other tool post continues to perform the processing. Even when the simultaneous processing is being performed, when it is determined that the effect on the processing is small, only the one tool post is retreated and the other tool post continues to perform the processing. Accordingly, whatever situation it is, compared with a conventional operational control method that causes all the tool post to take retreat operations, a labor and a time required for recovery are reduced to ensure achieving an improvement in processing efficiency and reducing the workpieces with processing failures.

The operational control method in the machine tool according to the disclosure is not at all limited to an aspect of the embodiment described above. Not to mention the overall configuration of the machine tool, but also the operational control and the like in the occurrence of the abnormality can be appropriately changed as necessary within a range not departing from the gist of the disclosure.

For example, in the above-described embodiment, since the tool holder is the tool post, when the abnormality occurs in the one tool holder, the one tool holder is retreated as the abnormality avoidance operation to be taken by the one tool holder. However, when, for example, the tool holder is not the tool post but is a tool holder constituted by including a cutting-tool on a rotating spindle, a rotation stop may be performed as the abnormality avoidance operation.

In the above-described embodiment, when the abnormality occurs in the one tool holder, and it is determined that the effect on the processing is large in the case where the one tool holder takes the abnormality avoidance operation, the other tool holder is retreated as a response operation to be taken by the other tool holder. However, when the processing can be continued without halting by changing a process condition and a processing route (for example, in the example illustrated in FIG. 3, decreasing a transfer velocity, decreasing a cutting amount, and the like), it is possible to employ change of the process condition and the processing route as the response operation. That is, for example, in the example as illustrated in FIG. 3, the other tool holder may take the response operation, such as decreasing the transfer velocity and decreasing the cutting amount.

Furthermore, in the above-described embodiment, when the simultaneous processing is being performed, it is determined a magnitude of the effect on the processing in the other tool holder in the case where the tool holder with the cutting-tool having the detected abnormality takes the abnormality avoidance operation. However, without the determination of such magnitude of the effect, it may be configured that when the simultaneous processing is being performed, the tool holder including the cutting-tool having the detected abnormality is retreated together with the other tool holder, and on the other hand, when the simultaneous processing is not being performed, only the tool holder including the cutting-tool having the detected abnormality is retreated and the other tool holder continues the processing.

When the tool holder is the tool post and the other tool post without the abnormality includes the cutting-tool corresponding to that of the one tool holder in which the abnormality has occurred, a process of the one tool holder may be assigned to the other tool holder. For example, in the processing that finishes the workpiece having the outer diameter of φ 40 mm into the outer diameter of φ 30 mm as described in the related art, when the outer diameter is removed to φ 35 mm with the cutting-tool 31 of the tool post A and the outer diameter is finished to φ 30 mm with the cutting-tool 32 of the tool post B, it is assumed that an abnormality occurs in the tool post B and the tool post B is retreated. At this time, the process of the tool post B may be assigned to the tool post A to continue the processing. That is, it is possible to finish to the last by alternately performing operations until a synchronization point in a program to perform a simultaneous operation.

Furthermore, when the machine tool is equipped with a tool changer, it is possible to resume the processing after the cutting-tool included in the tool holder that took the abnormality avoidance operation due to the occurrence of the abnormality is replaced with a spare cutting-tool.

In addition, while in the above-described embodiment, the NC lathe including two tool holders has been described, the disclosure can be preferably employed, for example, in an NC lathe that includes a plurality of tool posts but only one spindle and a machining center that includes a plurality of main spindle heads on which cutting-tools are mountable.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

What is claimed is:

1. An operational control method in a machine tool that comprises a plurality of tool holders and a plurality of cutting-tools, each of the plurality of cutting-tools being held by a respective tool holder, the machine tool relatively moving the tool holders with respect to a workpiece to process the workpiece, the operational control method comprising:
    determining whether one or more of the plurality of cutting-tools is both (a) having an abnormality and (b) processing a workpiece simultaneously with at least one other of the plurality of cutting-tools.

2. An operational control method in a machine tool that comprises a plurality of tool holders and a plurality of cutting-tools, each of the plurality of cutting-tools being held by a respective tool holder, the plurality of tool holders and cutting-tools comprising at least a first cutting-tool held by a first tool holder and a second cutting-tool held by a second tool holder, the machine tool relatively moving the tool holders with respect to a workpiece to process the workpiece, the operational control method comprising:
    determining that the first cutting-tool is both (a) having an abnormality and (b) processing a workpiece simultaneously with at least one other of the plurality of cutting-tools;
    determining a magnitude of deflection of the workpiece that would result from causing the first tool holder to take an abnormality avoidance operation;
    causing the tool holder that is holding the first cutting-tool to take the abnormality avoidance operation, said abnormality avoidance operation comprising at least one operation selected from among (i) retreating the first tool holder, (ii) stopping the first tool holder, and (iii) changing an operation being performed by the first tool holder to an operation previously being performed by a second of the tool holders; and
    causing said second tool holder to take a response operation, said response operation taken by said other of the plurality of tool holders comprising at least one operation selected from among (i) retreating the second tool holder, (ii) decreasing transfer velocity of the second tool holder, and (iii) decreasing a cutting amount of the second cutting tool.

3. An operational control method in a machine tool that comprises a plurality of tool holders and a plurality of cutting-tools, each of the plurality of cutting-tools being held by a respective tool holder, the plurality of tool holders and cutting-tools comprising at least a first cutting-tool held by a first tool holder and a second cutting-tool held by a second tool holder, the machine tool relatively moving the plurality of tool holders with respect to a workpiece to simultaneously process the workpiece, the operational control method comprising:

determining that an abnormality has occurred in the first cutting-tool during a processing;

determining a magnitude of an effect of causing the first tool holder to take an abnormality avoidance operation, based on (a) deflection of the workpiece that would result, (b) damage to the first tool that would result, and/or (c) deterioration of machining accuracy that would result;

causing the first tool holder to take the abnormality avoidance operation, said abnormality avoidance operation comprising at least one operation selected from among (i) retreating the first tool holder, (ii) stopping the first tool holder, and (iii) changing an operation being performed by the first tool holder to an operation previously being performed by an other of the tool holders; and causing said second tool holder to take a response operation based on a determination result from said determining the magnitude of the effect, said response operation comprising at least one operation selected from among (i) retreating the second tool holder, (ii) decreasing transfer velocity of the second tool holder, and (iii) decreasing a cutting amount of a cutting tool held by the other of the plurality of tool holders.

4. The operational control method in the machine tool according to claim 2, wherein
said determining the magnitude of deflection of the workpiece that would result from causing the first tool holder to take an abnormality avoidance operation comprises determining whether the second tool holder is in a predetermined area or outside the predetermined area.

5. The operational control method in the machine tool according to claim 3, wherein
said determining a magnitude of an effect comprises determining at least one of:
a variation amount of a cutting amount to the workpiece based on a current position and a travelling direction of each of the tool holders; and
whether each of the tool holders is positioned in a preliminary set area.

6. The operational control method in the machine tool according to claim 1, wherein:
a first of the plurality of cutting-tools is (a) having an abnormality and (b) processing a workpiece simultaneously with at least one other of the plurality of cutting-tools, and
the method further comprises:
(1) causing the tool holder that is holding the first cutting-tool to take an abnormality avoidance operation comprising at least one operation selected from among (i) retreating the first tool holder, (ii) stopping the first tool holder, and (iii) changing an operation being performed by the first tool holder to an operation previously being performed by a second of the tool holders, and
(2) causing a second of the plurality of tool holders to take a response operation comprising at least one operation selected from among (i) retreating the second tool holder, (ii) decreasing transfer velocity of the second tool holder, and (iii) decreasing a cutting amount of a cutting tool held by the second tool holder.

7. The operational control method in the machine tool according to claim 1, wherein:
a first of the plurality of cutting-tools is having an abnormality and (2) none of the plurality of cutting-tools is both (a) having an abnormality and (b) processing a workpiece simultaneously with at least one other of the plurality of cutting-tools, and
the method further comprises causing the tool holder that is holding the first cutting-tool to take an abnormality avoidance operation selected from among (i) retreating the first tool holder, (ii) stopping the first tool holder, and (iii) changing an operation being performed by the first tool holder to an operation previously being performed by a second of the tool holders.

8. The operational control method in the machine tool according to claim 1, wherein:
(1) a first of the plurality of cutting-tools is having an abnormality,
(2) a second of the plurality of cutting-tools is performing a second cutting-tool processing, and
(3) none of the plurality of cutting-tools is (a) having an abnormality and (b) processing a workpiece simultaneously with at least one other of the plurality of cutting-tools, and
the method further comprises causing the tool holder that is holding the first cutting-tool to take an abnormality avoidance operation selected from among (i) retreating the first tool holder, (ii) stopping the first tool holder, and (iii) changing an operation being performed by the first tool holder to an operation previously being performed by a second of the tool holders and the second cutting-tool continues performing said second cutting-tool processing.

9. The operational control method in the machine tool according to claim 1, wherein:
at least a first of the plurality of cutting-tools is having an abnormality, and
the method further comprises causing a first tool holder that is holding the first cutting-tool to take an abnormality avoidance operation selected from among (i) retreating the first tool holder, (ii) stopping the first tool holder, and (iii) changing an operation being performed by the first tool holder to an operation previously being performed by a second of the tool holders.

10. The operational control method in the machine tool according to claim 2, wherein the method further comprises at least one of:
determining whether one or more of the plurality of cutting-tools is both (a) having an abnormality, and (b) being followed in a forwarding direction by a tool holder that is not having an abnormality, and
determining whether a cutting amount of a cutting-tool will increase if another cutting-tool having an abnormality is caused to take an abnormality avoidance operation.

11. An operational control method in a machine tool that comprises a plurality of tool holders and a plurality of cutting-tools, each of the plurality of cutting-tools being held by a respective tool holder, the plurality of tool holders and cutting-tools comprising at least a first cutting-tool held by a first tool holder and a second cutting-tool held by a second tool holder, the machine tool relatively moving the tool holders with respect to a workpiece to process the workpiece, the operational control method comprising:

determining that the first cutting-tool is both (a) having an abnormality and (b) processing a workpiece simultaneously with at least one other of the plurality of cutting-tools;

determining a magnitude of an effect of causing the first tool holder to take an abnormality avoidance operation, based on (a) deflection of the workpiece that would result, (b) damage to the tool that would result, and/or (c) deterioration of machining accuracy that would result;

causing the first tool holder to take the abnormality avoidance operation, said abnormality avoidance operation comprising at least one operation selected from among (i) retreating the tool holder, (ii) stopping the tool holder, and (iii) changing an operation being performed by the tool holder to an operation previously being performed by an other of the tool holders; and causing said second tool holder to take a response operation, said response operation taken by said second tool comprising at least one operation selected from among (i) retreating the second tool holder, (ii) decreasing transfer velocity of the second tool holder, and (iii) decreasing a cutting amount of the second cutting tool.

12. The operational control method in the machine tool according to claim 11, wherein the operational control method further comprises at least one of:

determining whether one or more of the plurality of cutting-tools is both (a) having an abnormality, and (b) being followed in a forwarding direction by a tool holder that is not having an abnormality, and determining whether a cutting amount of a cutting-tool will increase if another cutting-tool having an abnormality is caused to take an abnormality avoidance operation.

13. An operational control method in a machine tool that comprises a plurality of tool holders and a plurality of cutting-tools, each of the plurality of cutting-tools being held by a respective tool holder, the plurality of tool holders and cutting-tools comprising at least a first cutting-tool held by a first tool holder and a second cutting-tool held by a second tool holder, the machine tool relatively moving the tool holders with respect to a workpiece to process the workpiece, the operational control method comprising:

determining that the first cutting-tool is both (a) having an abnormality and (b) processing a workpiece simultaneously with at least one other of the plurality of cutting-tools;

determining a magnitude of an effect of causing the first tool holder to take an abnormality avoidance operation on the processing by an other of the plurality of tool holders;

causing the first tool holder to take the abnormality avoidance operation, said abnormality avoidance operation comprising at least one operation selected from among (i) retreating the first tool holder, (ii) stopping the first tool holder, and (iii) changing an operation being performed by the first tool holder to an operation previously being performed by a second of the tool holders; and causing said of second tool holder to take a response operation based on a determination result from said determining the magnitude of the effect, said response operation taken by said second tool holder comprising at least one operation selected from among (i) retreating the second tool holder, (ii) decreasing transfer velocity of the second tool holder, and (iii) decreasing a cutting amount of the second cutting tool.

14. The operational control method in the machine tool according to claim 13, wherein said determining a magnitude of an effect comprises determining whether one or more of the plurality of cutting-tools is both (a) having an abnormality, and (b) being followed in a forwarding direction by a tool holder that is not having an abnormality.

15. The operational control method in the machine tool according to claim 13, wherein said determining a magnitude of an effect comprises determining whether a cutting amount of a cutting-tool will increase if another cutting-tool having an abnormality is caused to take an abnormality avoidance operation.

\* \* \* \* \*